(12) United States Patent
Gupta et al.

(10) Patent No.: US 8,753,077 B2
(45) Date of Patent: Jun. 17, 2014

(54) SLINGER SHIELD STRUCTURE

(75) Inventors: Sanjay Gupta, Andhra Pradesh (IN); Subbiah Natarajan, Andhra Pradesh (IN); Bansidhar Jagannath Phansalkar, Karnataka (IN)

(73) Assignee: General Electric Company, Schenectady, NY (US)

( * ) Notice: Subject to any disclaimer, the term of this patent is extended or adjusted under 35 U.S.C. 154(b) by 640 days.

(21) Appl. No.: 12/842,633

(22) Filed: Jul. 23, 2010

(65) Prior Publication Data
US 2012/0020783 A1 Jan. 26, 2012

(51) Int. Cl.
  *F04D 29/04* (2006.01)
  *H02K 5/10* (2006.01)

(52) U.S. Cl.
  USPC ............ 415/206; 415/168.1; 415/168.2; 415/106; 416/181; 416/186 R; 416/223 B; 310/54; 310/58; 310/62; 310/63; 310/88

(58) Field of Classification Search
  USPC ........ 415/204, 206, 168.1, 168.2, 171.1, 106; 416/181, 183, 185, 186 R, 188, 223 B; 310/54, 58, 62, 63, 88; 277/423, 424, 277/425, 429
  See application file for complete search history.

(56) References Cited

U.S. PATENT DOCUMENTS

| | | | |
|---|---|---|---|
| 1,476,776 A * | 12/1923 | Stamm et al. | 310/63 |
| 3,272,429 A * | 9/1966 | Wood | 416/186 R |
| 3,887,464 A | 6/1975 | Ayres | |
| 4,583,747 A | 4/1986 | Aufderhaar et al. | |
| 4,790,543 A | 12/1988 | Wittmeyer et al. | |
| 4,900,957 A | 2/1990 | Barker et al. | |
| 4,908,538 A * | 3/1990 | Geberth, Jr. | 310/88 |
| 5,228,700 A | 7/1993 | Biesold et al. | |
| 5,931,735 A | 8/1999 | Schierling | |
| 6,082,000 A * | 7/2000 | Fornasa | 416/186 R |
| 6,250,876 B1 | 6/2001 | Hogholt | |
| 6,719,541 B2 * | 4/2004 | Bundy | 417/366 |
| 7,265,468 B1 | 9/2007 | Mancl et al. | |
| 7,326,029 B2 * | 2/2008 | Ahlroth et al. | 415/106 |
| 2004/0263008 A1 * | 12/2004 | Voigt et al. | 310/58 |

FOREIGN PATENT DOCUMENTS

| | | |
|---|---|---|
| EP | 0021599 A1 | 1/1981 |
| EP | 0125675 A2 | 11/1984 |
| EP | 0271663 A2 | 6/1988 |
| EP | 0449425 B1 | 1/1996 |
| WO | 80/00227 A | 2/1980 |
| WO | 82/00695 A1 | 3/1982 |
| WO | 94/21923 A1 | 9/1994 |
| WO | 98/48939 A1 | 11/1998 |
| WO | 98/48941 A1 | 11/1998 |

* cited by examiner

Primary Examiner — Christopher Verdier
(74) Attorney, Agent, or Firm — Cantor Colburn LLP

(57) ABSTRACT

A slinger shield structure is provided and includes a first annular disc, having a body, opposing faces defining an aperture extending through the body and through-holes extending through the body, which are arrayed around the aperture, a second annular disc having a body and opposing faces defining an aperture extending through the body, a hub for connection with the first and second annular discs at the respective apertures and radial vanes suspended between the first and second annular discs at a distance from the hub to define radial channels between adjacent radial vanes and drainage channels between the radial vanes and the hub.

20 Claims, 7 Drawing Sheets

SLINGER SHIELD STRUCTURE

BACKGROUND OF THE INVENTION

The subject matter disclosed herein relates to electric motors and other rotating equipment whose performance may be adversely affected due to entry of fluid inside the equipment and, more particularly, to a slinger shield to prevent such entry of fluid.

A slinger shield is normally a cylindrical disc with a concentric hole, which is mounted on a shaft by press fitting. To accommodate the slinger shield, an end shield is provided with a cylindrical pocket whose depth and width may be greater than or equal to the slinger shield thickness and width. Assembly of the slinger shield on the shaft thus provides a very small radial clearance between an outer diameter of the slinger shield and an inner diameter of the cylindrical pocket of the end shield. Also, there is often an axial clearance between a back face of the slinger shield and a front face of the end shield cylindrical pocket. While this clearance is required to permit relative motion between the rotating slinger shield and the stationary end shield, it is relatively small to substantially impede fluid (e.g., water) entry.

Nevertheless, fluid entry occurs and may need to be addressed for certain applications. To this end, water repellent motor seals have been proposed and generally include a sleeve that repels water by virtue of employing a surface material on which moisture resists spreading. These types of seals may be employed in high-speed universal motor applications running at, for example, over 10,000 or even over 20,000 rpm to protect the bearings from moisture damage. A fan drive with a water slinger shield has also been proposed whereby water entry is prevented by employing o-ring like seal construction. If any water that falls on the slinger during rotation is thrown off, it is directly toward a drip pan placed below. This type of seal may be applicable to a vertically mounted electric motor application. Labyrinth seals have also been used and repel water by directing it through a labyrinthine course.

Labyrinth seals can be effective in terms of achieving requirements of Ingress Protection 55 (IP55) standards but are expensive. Conversely, water repellent motor seals and slinger shields are relatively inexpensive but not as effective to provide IP-55 or higher degrees of ingress protection.

BRIEF DESCRIPTION OF THE INVENTION

According to one aspect of the invention, a slinger shield structure is provided and includes a first annular disc, having a body, opposing faces defining an aperture extending through the body and through-holes extending through the body, which are arrayed around the aperture, a second annular disc having a body and opposing faces defining an aperture extending through the body, a hub for connection with the first and second annular discs at the respective apertures and radial vanes suspended between the first and second annular discs at a distance from the hub to define radial channels between adjacent radial vanes and drainage channels between the radial vanes and the hub.

According to another aspect of the invention, an apparatus is provided and includes a rotor, which is rotatable about a centerline, an end shield, disposed about the rotor, which is rotatably fixed relative to the centerline and which defines a recess therein and an annular slinger shield defining an aperture through which the rotor extends such that rotor rotation is transmitted to the annular slinger shield with the annular slinger shield fit into the recess, the annular slinger shield including a body, which axially admits fluid from between the end shield and the annular slinger shield, having an interior defining channels through which the admitted fluid is centrifugally forced to flow by annular slinger shield rotation toward pathways defined radially between the end shield and the annular slinger shield.

According to yet another aspect of the invention, an apparatus is provided and includes a rotor, which is rotatable about a centerline, an end shield, disposed about the rotor, which is rotatably fixed relative to the centerline and which defines a recess therein, first and second annular discs to fit within the recess, each of the first and second annular discs having a body and opposing faces defining an aperture extending through the body, and the opposing faces of one of the first or the second annular disc further defining through-holes extending through the body, which are arrayed around the aperture, a hub for transmitting rotor rotation to the annular discs and radial vanes suspended between the first and second annular discs at a distance from the hub to generate a positive pressure head to drive particulate matter and fluid passing through the through-holes away from the hub during rotation of the first and second annular discs and to permit fluid drainage during non-rotation of the first and second annular discs.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Fluids, dust and/or other small particles (hereinafter "fluids") are expelled from an electric motor or similar rotating equipment whose performance would be adversely affected or degraded by the presence of fluids in its interior. The expulsion is achieved by a positive pressure head and suction action and is capable of achieving performance in accordance with Ingress Protection 55 (IP55) standards.

Figure 1:
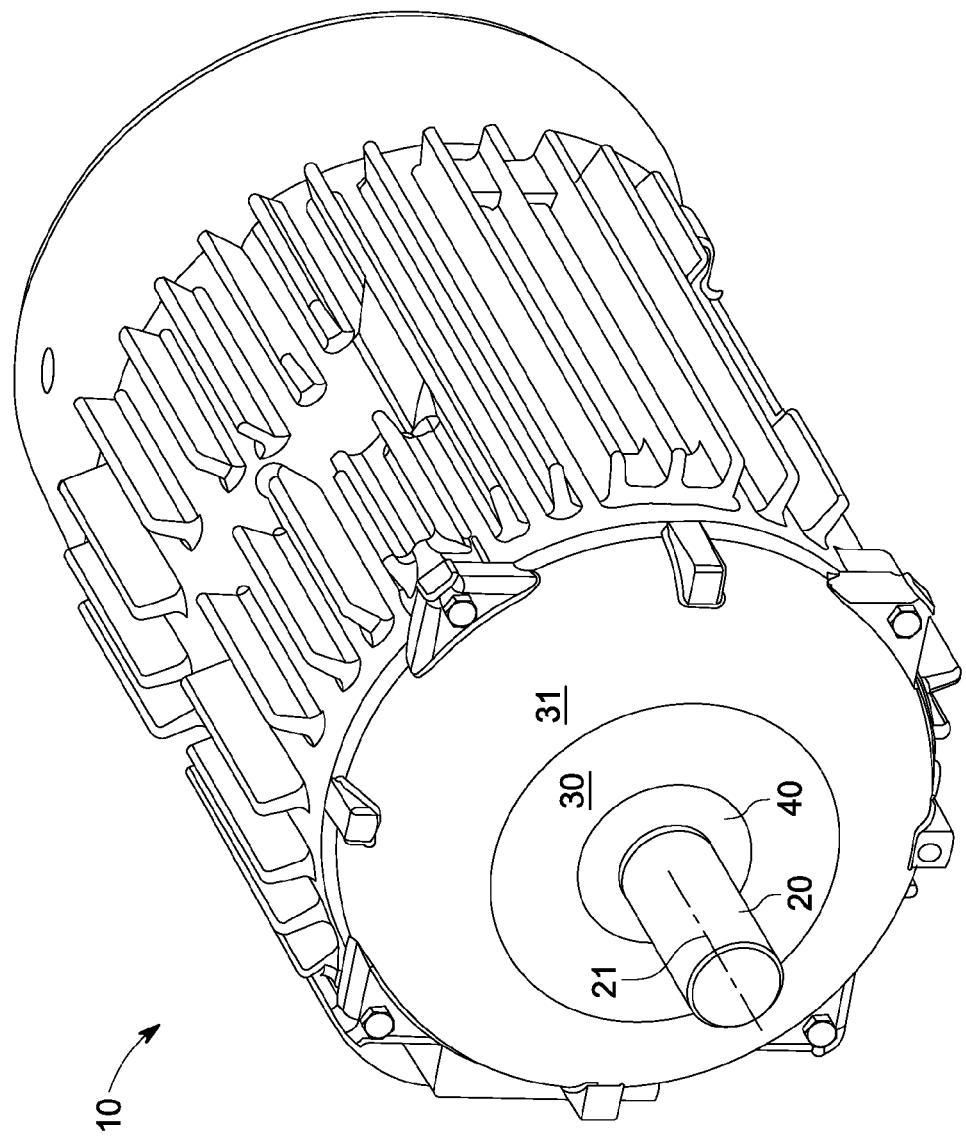
FIG. 1 is a perspective view of an electric motor from which fluid is to be expelled.
Figure 2:
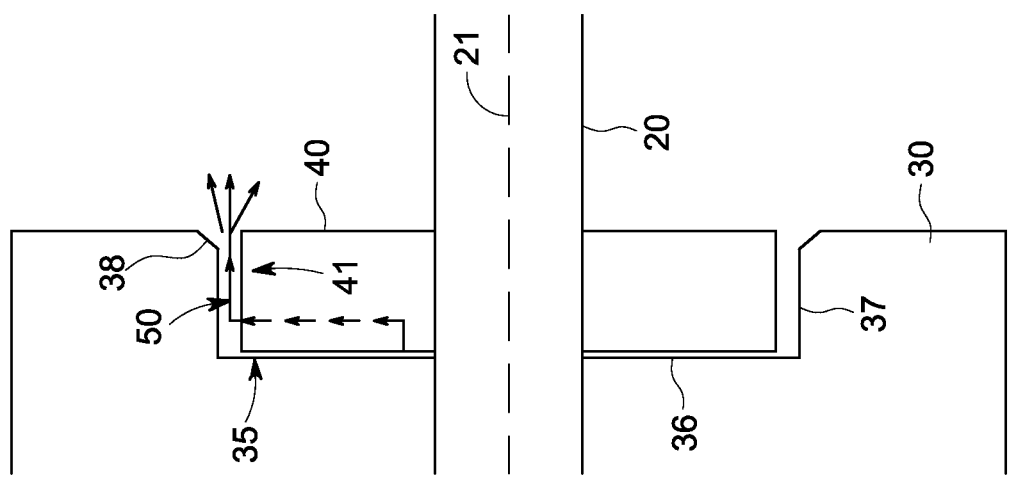
FIG. 2 is a side view of a slinger shield.

With reference to FIGS. 1 and 2, an apparatus 10 is provided and includes a rotor 20, which rotates about a centerline 21, an end shield 30 of, for example, an electric motor 31, and a slinger shield structure 40 (hereinafter referred to as "a slinger shield 40"). The end shield 30 is disposed about the rotor 20 and is rotatably fixed about the centerline 21 such that relative rotation occurs between the rotor 20 and the end shield 30. The end shield 30 is formed to define a substantially annular recess 35 proximate to and about the rotor 20 with an axial face 36 and a radial face 37. The radial face 37 may be angled to form a chamfer 38.

The slinger shield 40 is insertible into the recess 35 and press fittable onto the rotor 20. The slinger shield 40 therefore perimetrically surrounds the rotor 20 and forms pathways 50 extending toward the chamfer 38 in the clearance defined radially between a radially outward portion 41 of the slinger shield 40 and the radial face 37 of the recess 35. The slinger shield 40 is rotatable about the centerline 21 in-phase with the rotor 20 or, in some cases, in the direction of rotation of but off-phase with the rotor 20.

The recess 35 may be defined at the drive end (DE) or at the opposite drive end (ODE) of the apparatus. In either case, the recess 35 may open up toward an exterior or be disposed in an interior of the apparatus 10.

Figure 3:
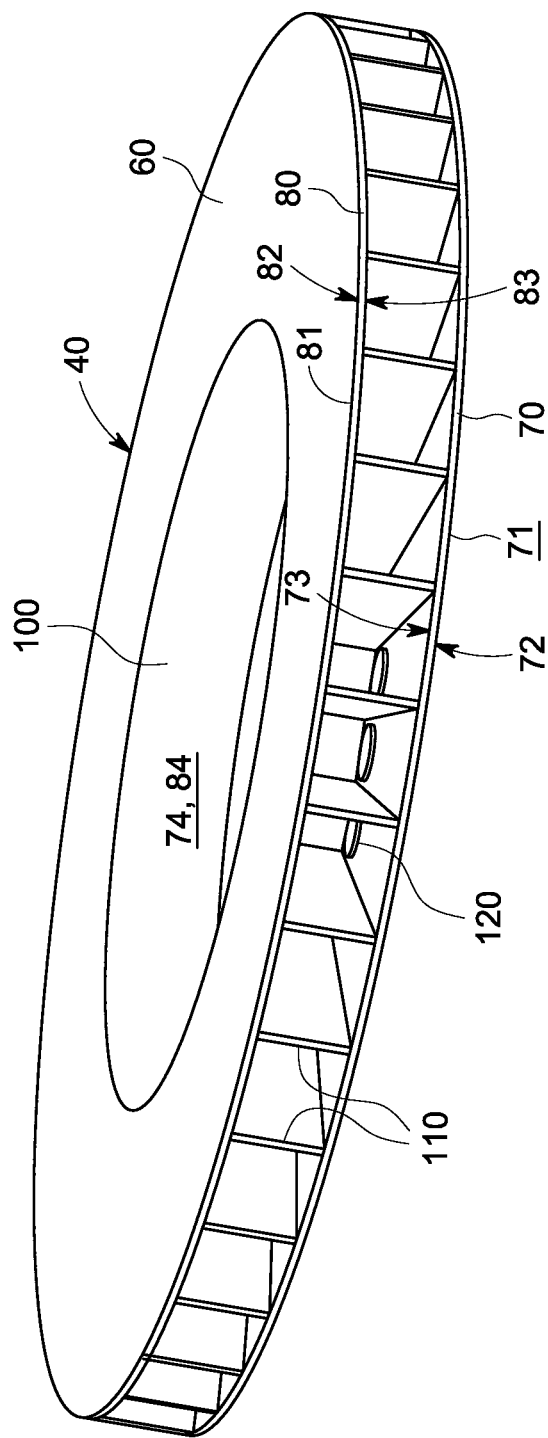
FIGS. 3 and 4 are perspective views of the slinger shield of FIG. 2.
Figure 4:
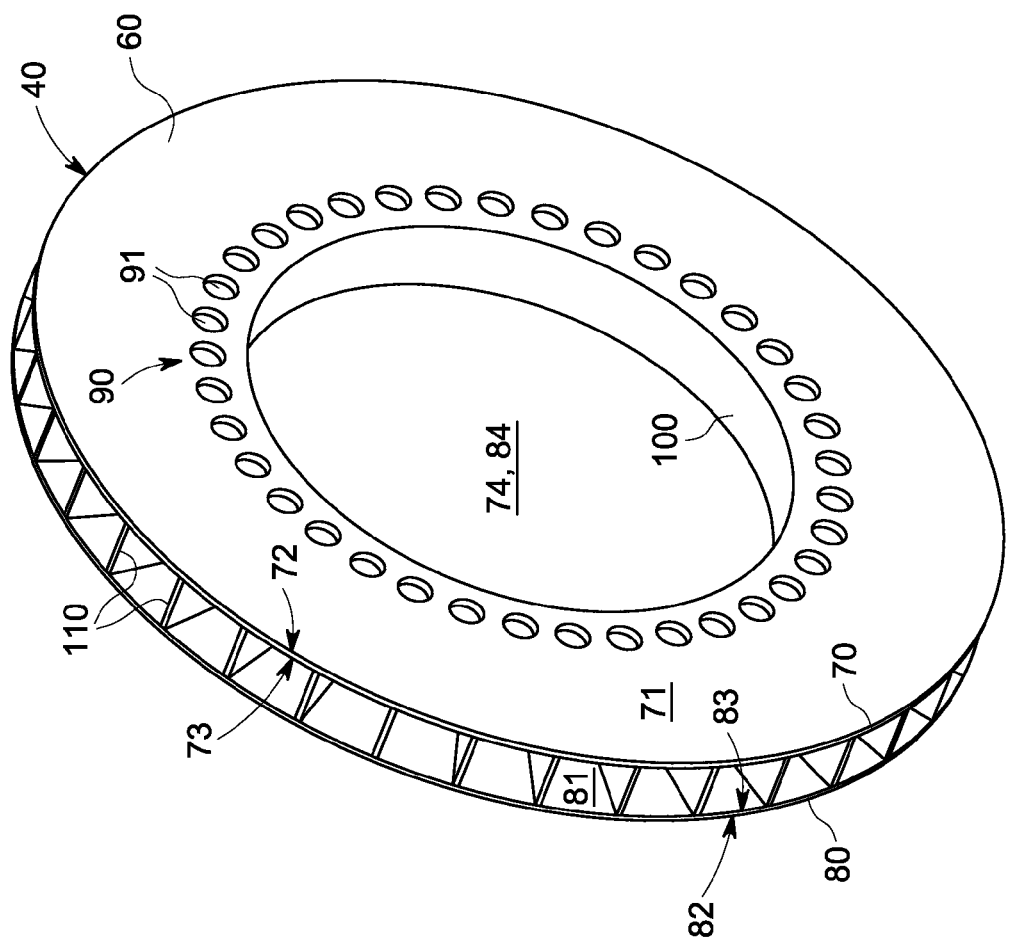

With reference to FIGS. 3 and 4, the slinger shield 40 includes a substantially annular body 60. The body 60 includes first and second annular discs 70 and 80, respectively, a hub 100 and a plurality of radial vanes 110. One of the annular discs, say the first annular disc 70, includes a body 71 having opposing outward and inward faces 72 and 73 defining an aperture 74 through the body 71. Similarly, the second annular disc 80 includes a body 81 having opposing outward and inward faces 82 and 83 defining an aperture 84 through the body 81. The outward face 71 of the first annular disc 70 may abut the axial face 36 of the recess 35 when the slinger shield 40 is inserted into the recess 35 and the outward and inward faces 72 and 73 of the first annular disc 70 may define an array 90 of fluid admitting through-holes 91. The first and second annular discs 70 and 80 may be disposed substantially parallel and axially in-line with one another such that the body 60 fits within the recess 35, which may be cylindrical or a similar shape.

The hub 100 connects with the first and second annular discs 70 and 80 proximate to the respective apertures 74 and 84 and may be tubular or substantially cylindrical. Further, the hub 100 is formed to be substantially tightly press fit around and on the rotor 20 such that rotation of the rotor 20 is at least partially or wholly transmitted to the slinger shield 40. This may be accomplished by, for example, the slinger shield 40 being press fittable on the rotor 30 or by an interior surface of the hub 100 and/or an exterior surface of the rotor 20 being formed with a high friction material or mating devices.

Figure 6:
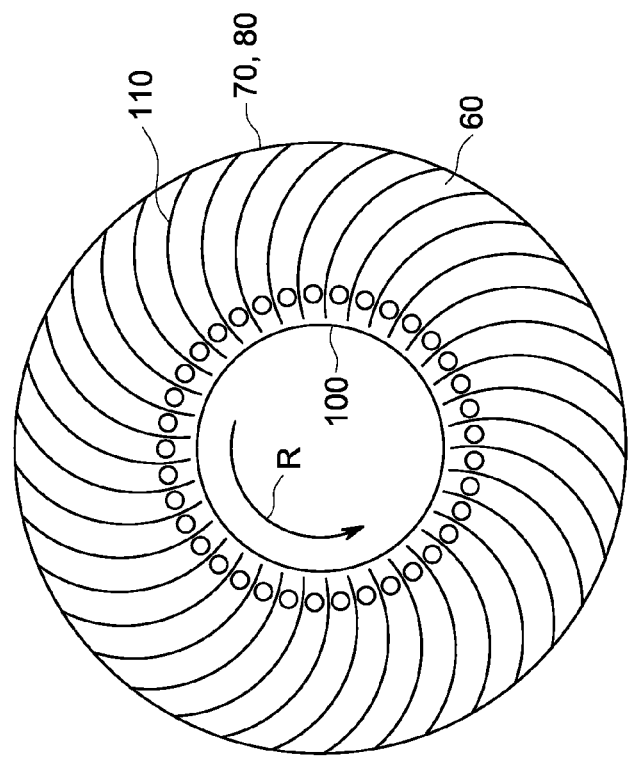
FIGS. 6 and 7 are axial cutaway views of the slinger shield of FIG. 2 according to embodiments.
Figure 5:
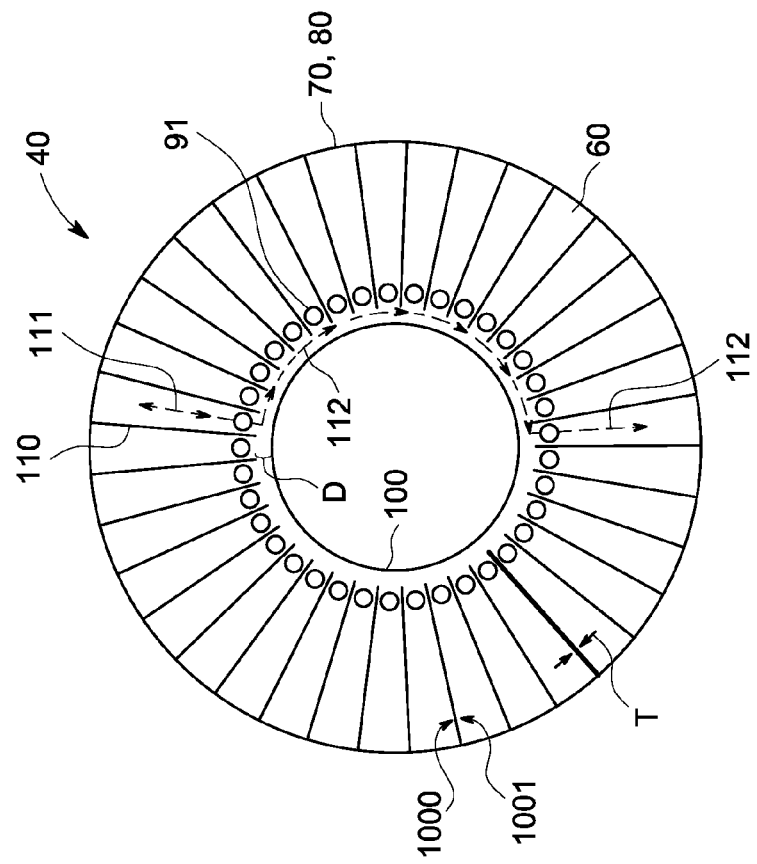
FIG. 5 is an axial cutaway view of the slinger shield of FIG. 2.
Figure 7:
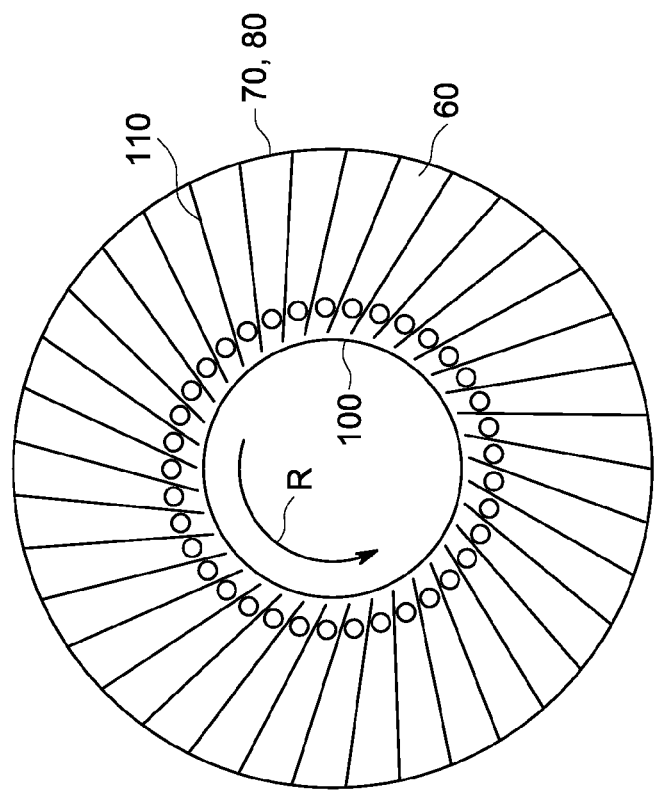

As shown in FIGS. 5-7, radial vanes 110 are suspended between the first and second annular discs 70 and 80 at a distance, D, from the hub 100. A radially outward extent of the radial vanes 110 may be radially aligned with or disposed inward from radially outward portions of the annular discs 70 and 80.

With this construction, the body 60 axially admits fluid via the through-holes 91 from a space defined between the axial face 36 of the end shield 30 and the slinger shield 40, with the radial vanes 110 in an interior of the body 60 defining radial channels 111 through which the admitted fluid is centrifugally forced to flow by the slinger shield 40 rotation toward the pathways 50. That is, the radial vanes 110 generate a positive pressure head that drives the admitted fluid and any particulate matter that may be carried along with the admitted fluid toward the pathways 50. This positive pressure head leads to further generation of a suction effect acting on the fluid and increasing a tendency of the fluid to pass out of the space and through the through-holes 91.

When slinger shield 40 rotation ceases, remaining fluid at an upper hemisphere of the slinger shield is permitted to gravitationally drain along the radial channels 111 in the upper hemisphere toward the hub 100 and then around the hub 100 along drainage channels 112 defined by the separation between the radial vanes 110 and the hub 100 by the distance, D, toward a lower hemisphere of the slinger shield 40. This fluid as well as the fluid already in the lower hemisphere gravitationally drains away from the hub 100 along the radial channels 111 in the lower hemisphere (which act as if they are drainage channels 112) toward the pathways 50.

Each through-hole 91 is disposed circumferentially between adjacent radial vanes 110. Thus, a number of the through-holes 91 may correspond to a number of the radial vanes 110. Each through-hole 91 may be ovoid or circular in shape and the through-holes 91 are arrayed in an ovoid or circular pattern on the outward face 71. Protrusions 120 (see FIG. 3) may be respectively disposed at an edge of each of the through-holes 91 at the inward face 72 to disrupt a flow of fluid through the through-holes 91 when the slinger shield 40 is not rotating.

Figure 8:
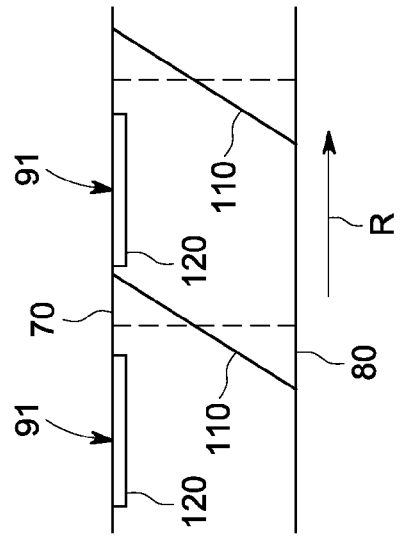
FIGS. 8 and 9 are enlarged views of radial vanes of the slinger shield of FIG. 2 according to embodiments.

The radial vanes 110 may be separated from one another by at least a width of each of the through-holes 91. The radial vanes 110 may have substantially flat planar surfaces 1000, 1001 or, as shown in FIG. 6, the radial vanes 110 may be partially or wholly curved (i.e., spiraled) in agreement with a direction of rotation, R, where R is unidirectional. Where the radial vanes 110 have the substantially flat planar surfaces 1000, 1001, they may have a thickness, T, which is relatively narrow as compared to, e.g., a diameter of the through-holes 91 and they may be oriented substantially in parallel with a radial dimension of the annular discs 70 and 80. Alternatively, as shown in FIG. 7, the radial vanes 110 may be disposed at an oblique angle relative to the radial dimension in agreement with the rotation direction, R, where R is unidirectional. Also, where a direction of rotation, R, is unidirectional, the radial vanes 110 may be radially twisted as shown in FIG. 8. As a whole, the shape and the orientation of the radial vanes 110 may be uniform for each or varied.

Figure 9:
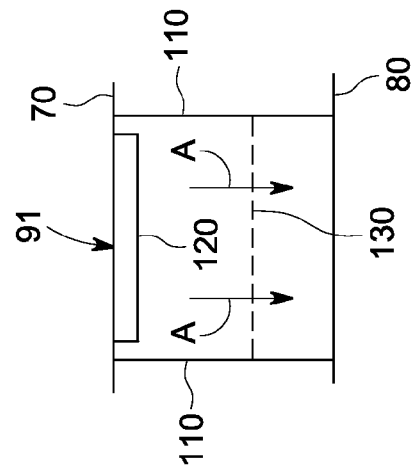
Figure 10:
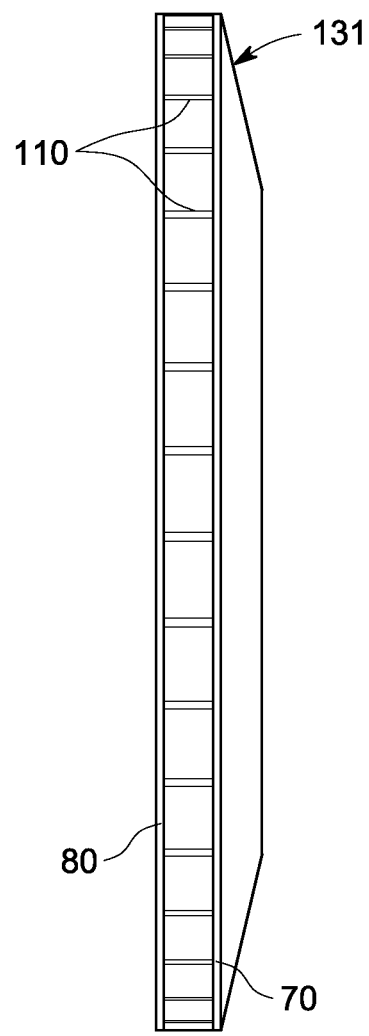
FIG. 10 is a side view of the slinger shield of FIG. 2 according to further embodiments.

In a further embodiment, as shown in FIG. 9, a baffle 130 may be provided between adjacent radial vanes 110 within the radial channels 111 to encourage flow moving radially along the radial channels 111 in the axial direction, A. In this way, fluid is directed to flow toward and axially along the pathways 50. Moreover, the baffle 130 discourages pooling of fluid within the radial channels 111 when the slinger shield is not rotating. As shown in FIG. 10, similar axial flow encouragement may be achieved by configuring the first annular disc 70 with a frusto-conical cross-section 131.

In accordance with embodiments, at least one or more of the annular discs 70 and 80, the hub 100 and the radial vanes 110 may include at least one of a polymer, a plastic, a metallic and a cardboard material. Further, at least one or more of the annular discs, the hub and the radial vanes may include homogenous materials or dissimilar materials. In particular, the slinger shield 40 may be formed of neoprene or some other similar material.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A slinger shield structure fit for disposition within a recess of an end shield comprising first and second axial faces displaced from one another along an axis and a radial face extending between the first and second axial faces, the recess being defined by the second axial face and the radial face, the slinger shield structure, comprising:
   a first annular disc, having a body, opposing faces defining an aperture extending through the body and through-holes extending through the body, which are arrayed around the aperture to admit fluid from between the second axial face of the end shield and the first annular disc;
   a second annular disc having a body and opposing faces defining an aperture extending through the body;
   a hub for connection with the first and second annular discs at the respective apertures; and
   radial vanes suspended between the first and second annular discs at a distance from the hub to define radial channels between adjacent radial vanes and drainage channels between the radial vanes and the hub,
   the through-holes being defined radially proximate to narrow-most sections of the radial channels.

2. The slinger shield structure according to claim 1, wherein each of the through-holes is disposed circumferentially between adjacent radial vanes.

3. The slinger shield structure according to claim 1, wherein each of the through-holes is circular in shape.

4. The slinger shield structure according to claim 1, wherein the through-holes are arrayed in a circular pattern.

5. The slinger shield structure according to claim 1, wherein the radial vanes are separated from one another by at least a width of each of the through-holes.

6. The slinger shield structure according to claim 1, wherein each of the radial vanes has substantially flat planar surfaces.

7. The slinger shield structure according to claim 1, wherein each of the radial vanes is curved.

8. The slinger shield structure according to claim 1, wherein each of the radial vanes is substantially parallel with a radial dimension of the first and second annular discs.

9. The slinger shield structure according to claim 1, wherein each of the radial vanes is obliquely angled with respect to a radial dimension of the first and second annular discs.

10. The slinger shield structure according to claim 1, wherein each of the radial vanes is twisted along a radial direction.

11. The slinger shield structure according to claim 1, further comprising a baffle disposed between adjacent radial vanes.

12. The slinger shield structure according to claim 1, wherein the first annular disc has a frusto-conical cross-section.

13. The slinger shield structure according to claim 1, wherein at least one or more of the annular discs, the hub and the radial vanes comprises at least one of a polymer, a plastic, a metallic and a cardboard material.

14. The slinger shield structure according to claim 1, wherein at least one or more of the annular discs, the hub and the radial vanes comprises homogenous materials.

15. A slinger shield structure, comprising:
   a first annular disc, having a body, opposing faces defining an aperture extending through the body and through-holes extending through the body, which are arrayed around the aperture;
   a second annular disc having a body and opposing faces defining an aperture extending through the body;
   a hub for connection with the first and second annular discs at the respective apertures; and
   radial vanes suspended between the first and second annular discs at a distance from the hub to define radial channels between adjacent radial vanes and drainage channels between the radial vanes and the hub, further comprising protrusions respectively disposed at an edge of each of the through-holes.

16. An apparatus, comprising:
   a rotor, which is rotatable about a centerline and which has a longitudinal axis defined along the centerline;
   an end shield, disposed about the rotor, the end shield being rotatably fixed relative to the centerline and comprising:
      a first axial face at a first plane;
      a second axial face at a second plane recessed from the first plane in a direction defined along the longitudinal axis of the rotor; and
      a radial face extending from a radially outermost periphery of the second axial face to a radially innermost periphery of the first axial face,
   the second axial face and the radial face cooperatively defining a recess in the end shield; and
   an annular slinger shield defining an aperture through which the rotor extends such that rotor rotation is transmitted to the annular slinger shield with the annular slinger shield fit into the recess, the annular slinger shield having a structure including:
      a body, which axially admits fluid from between the end shield and the annular slinger shield, having an interior defining channels through which the admitted fluid is centrifugally forced to flow by annular slinger shield rotation toward pathways defined radially between the end shield and the annular slinger shield.

17. The apparatus according to claim 16, wherein the recess is defined at an axial end of the end shield and opposing first and second faces of the annular slinger shield are oriented to face toward the second axial face and an exterior, respectively, and
   wherein the admitted fluid is admitted from a space defined between the first face and the second axial face.

18. The apparatus according to claim 16, wherein the interior further defines drainage channels by which the admitted fluid drains toward the pathways when the annular slinger shield is rotatably fixed about the centerline.

19. An apparatus, comprising:
   a rotor, which is rotatable about a centerline;
   an end shield, disposed about the rotor, the end shield being rotatably fixed relative to the centerline and the end shield being formed to define a recess; and
   an annular slinger shield defining an aperture through which the rotor extends such that rotor rotation is transmitted to the annular slinger shield with the annular slinger shield fit into the recess, the annular slinger shield having a structure including:
   a body, which axially admits fluid from between the end shield and the annular slinger shield, having an interior defining channels through which the admitted fluid is centrifugally forced to flow by annular slinger shield rotation toward pathways defined radially between the end shield and the annular slinger shield, wherein the recess is defined at an axial end of the end shield and opposing first and second faces of the annular slinger shield are oriented to face toward an axial face of the recess and an exterior, respectively, wherein the admitted fluid is admitted from a space defined between the first face and the axial face of the recess, and wherein the first face is formed to define a plurality of through-holes through which the admitted fluid is admitted and further comprising a plurality of projections respectively disposed at each of the through-holes.

20. An apparatus, comprising:

a rotor, which is rotatable about a centerline;

an end shield, disposed about the rotor, the end shield being rotatably fixed relative to the centerline and the end shield being formed to define a recess;

first and second annular discs to fit within the recess, each of the first and second annular discs having a body and opposing faces defining an aperture extending through the body, and the opposing faces of one of the first or the second annular disc further defining through-holes extending through the body, which are arrayed around the aperture in respective locations at which fluid ingress via the through-holes into an interior defined between the first and second annular discs is permitted during rotation of the first and second annular discs and fluid egress via the through-holes from the interior is prevented during the rotation of the first and second annular discs;

a hub for transmitting rotor rotation to the first and second annular discs to drive the rotation of the first and second annular discs; and radial vanes suspended between the first and second annular discs at a distance from the hub to generate a positive pressure head to drive particulate matter and fluid passing through the through-holes away from the hub during the rotation of the first and second annular discs and to permit fluid drainage during non-rotation of the first and second annular discs.

* * * * *